United States Patent [19]
Cotty, Jr. et al.

[11] Patent Number: 6,031,649
[45] Date of Patent: Feb. 29, 2000

[54] SCANNED LASER BEAM ILLUMINATOR

[75] Inventors: Glenn Martin Cotty, Jr., Pearl River; Glen Clyden Argabright, Metairie, both of La.

[73] Assignee: Lockheed Martin Corp., New Orleans, La.

[21] Appl. No.: 09/185,830

[22] Filed: Nov. 4, 1998

[51] Int. Cl.[7] .................................................. G02B 26/08
[52] U.S. Cl. .................. 359/196; 359/198; 359/201; 359/212; 359/223; 359/225; 359/226; 359/900
[58] Field of Search ..................... 359/201–226, 359/900, 196–200; 362/102, 103, 109, 110, 259

[56] References Cited

U.S. PATENT DOCUMENTS 4,706,773 11/1987 Reinaud ................................... 180/169
5,334,991 8/1994 Well et al. ............................... 359/201

*Primary Examiner*—James Phan
*Attorney, Agent, or Firm*—W. H. Meise; T. G. Fierke

[57] ABSTRACT

A portable illuminator for use in an atmosphere of fog, haze or particulate matter includes a laser for generating a light beam, and a light-beam scanner for scanning the laser beam over a line or area to be illuminated. The scanning may be accomplished by mechanically moving the mirror or the laser, or a moving lens may be used. In another embodiment, a microelectronic scanning reflector is used.

13 Claims, 3 Drawing Sheets

… …

SCANNED LASER BEAM ILLUMINATOR

FIELD OF THE INVENTION

This invention relates to portable illuminators for use in conditions of fog, haze or particulate matter, as for example in locations which emergency workers might enter.

BACKGROUND OF THE INVENTION

One of the major problems which is associated with emergency crew operations working at fires is that of visibility. The electrical power is often inoperative, and so there are no light sources in many of the rooms. Even if there were light sources, the smoke and particulate matter is often so thick that they cannot be seen.

Visibility at emergency locations is very important. Rooms must often be traversed to examine other portions of the structure, and those rooms may be filled with obstacles or items which, while innocuous in a normally illuminated scene, become potential traps under the emergency conditions. Firemen and other emergency workers often carry high-intensity halogen flashlights, to aid in seeing. At the emergency location, however, these powerful flashlights often provide little help, because of the blooming or reflection of the light beam from the haze and particulate matter.

Improved light sources are desired for use under conditions of fog, haze and airborne particulate matter.

SUMMARY OF THE INVENTION

A portable lighting apparatus, according to an aspect of the invention, includes a laser for, when energized, generating unmodulated visible light in a substantially collimated beam. For use in a portable apparatus, the laser should preferably be a solid-state laser. The apparatus includes a battery coupled to the laser for energizing the laser, for thereby producing the substantially collimated beam of light. An electrically powered light scanner is electrically coupled to the battery, and optically coupled to the laser, for scanning the beam in at least one direction, to produce a scanned beam of the visible light. In another embodiment of the invention, the scanner scans the beam in a second direction orthogonal to the first direction, to produce a two-dimensional scanned beam of the visible light. In a particularly advantageous version of the invention, the scanner includes a mirror interposed in the path of the beam, and an electrically powered motor coupled to the mirror for causing the orientation of the mirror relative to the incident light beam to change in a cyclical manner. The greatest utility is believed to be when the light scanner scans the beam in the one direction over a scanning angle greater than 5° and less than 45°. In order to enable persistence of the perceived view to result in an integrated understanding of the illuminated portion of the environment, each scan of the beam in the one direction occurs in an interval which is no greater than 1/10 second, which is to say a scan rate in that one dimension which is greater than 10 Hz. In such an avatar, the scanner, if it scans in a second direction, orthogonal to the first direction, should scan that second direction in an interval which is no greater than 1/5 of the interval in the one direction, which is to said that a scan in the second direction should take no longer than 20% of the time for a scan in the first direction. Another advantageous manifestation of the invention includes a light beam spreader coupled in the path of the light beam for spreading the substantially collimated light beam emanating from the laser in a manner which broadens the light beam, to thereby produce a broad light beam. The broad light beam may be substantially collimated or diverging.

A method according to a mode of the invention uses a portable lighting apparatus as set forth in any embodiment above, and includes the step of pointing the scanned beam in the direction in which one may desire to proceed, to thereby illuminate the environment and make any impediments visible.

DESCRIPTION OF THE INVENTION

Figure 1:
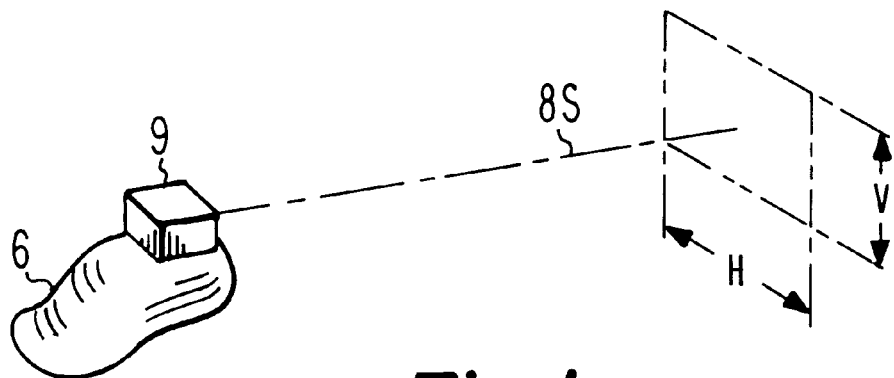
FIG. 1 is a simplified representation of an apparatus according to an aspect of the invention, affixed to a fireman's hat.

FIG. 1 is a simplified representation of one embodiment of the invention. In FIG. 1, a fireman's hat 6 has a box or housing 9 mounted thereon. Housing 9 is large enough to accommodate a collimated-light-beam scanner according to an aspect of the invention. As illustrated in FIG. 1, the scanner housing 10 emits a scanned light beam designated 8S, which raster-scans in vertical (V) and horizontal (H) directions, much like a television display. As illustrated in FIG. 1, the scanning light beam 8S is illustrated as forming a rectangular pattern, as though the scanning light beam were falling onto a wall. This is for simplicity in illustrating the scanning pattern, and in actual use such a pattern would only be visible when viewing a flat surface. When viewing a room with its ordinary accoutrements, those items in the room which lie within the scanned region would be visible.

Figure 2:
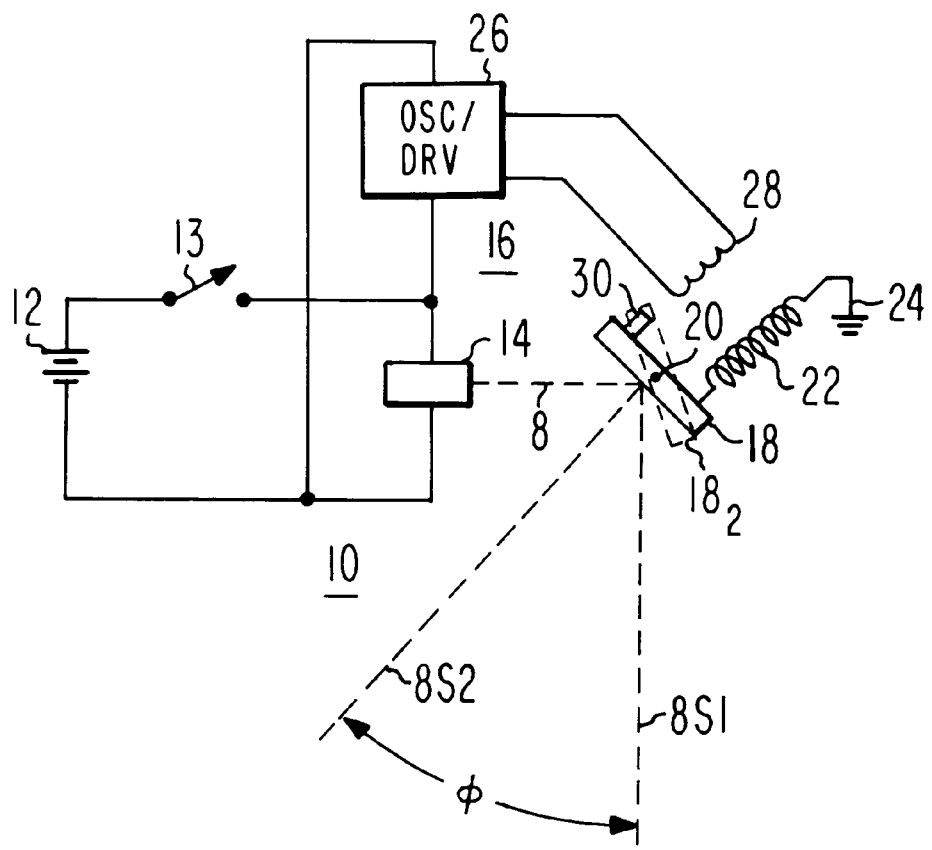
FIG. 2 is a simplified functional representation, in block and schematic form, of one embodiment of the invention.

FIG. 2 is a simplified diagram in block and schematic form, illustrating an embodiment of the invention. In FIG. 2, scanner 10 includes a portable electrical power source, which is illustrated as a battery 12. Battery 12 is connected by way of a controllable ON-OFF switch 13 to a laser illustrated as a block 14. Laser 14, when energized, produces a collimated beam of light illustrated as a dash-line 8. In this context, collimated refers to a beam of light which has an equal-phase front, so that the beam does not diverge significantly over distances of tens or hundreds of feet.

As illustrated in FIG. 2, beam of light 8 impinges on the reflecting surface of a mirror 18 of a light scanner 16. Mirror 18 is free to pivot around a hinge axis 20, and is held in the illustrated resting position by a spring 22 connected to structure illustrated by a ground symbol 24 which is fixed relative to axis 8. Thus, mirror 18 is free to pivot around axis 8, and tends to be restored to the illustrated position by spring 22. Scanner 16 also includes a block 26 illustrated as an oscillator/driver (osc/drv), which includes an oscillator which produces a coil drive waveform (not illustrated) for driving a solenoidal coil 28, for producing a varying magnetic field. A magnetically influenced piece or slug 30, such as a piece of iron or a magnet, is affixed to mirror 18, and is attracted toward coil 28 (or repulsed therefrom) each time coil 28 produces a magnetic field, or a change in an already-existing magnetic field. The varying drive waveform produced by osc/drv block 26 causes a periodically varying magnetic field in the vicinity of coil 28, which recurrently attracts or repulses piece 30, thereby causing mirror 18 to pivot or vibrate between its rest position (illustrated by solid lines) and a second position, illustrated by dotted lines and designated 18$_2$. This vibration or pivoting of mirror 18 about axis 20 causes the mirror to reflect incident light beam 8 in the direction indicated as 8S1 when in its rest position, and in the direction indicated as 8S2 when at the extreme of its deviation away from its rest position. The angle of the deviation or recurrent scan is indicated as being φ.

Figure 3:
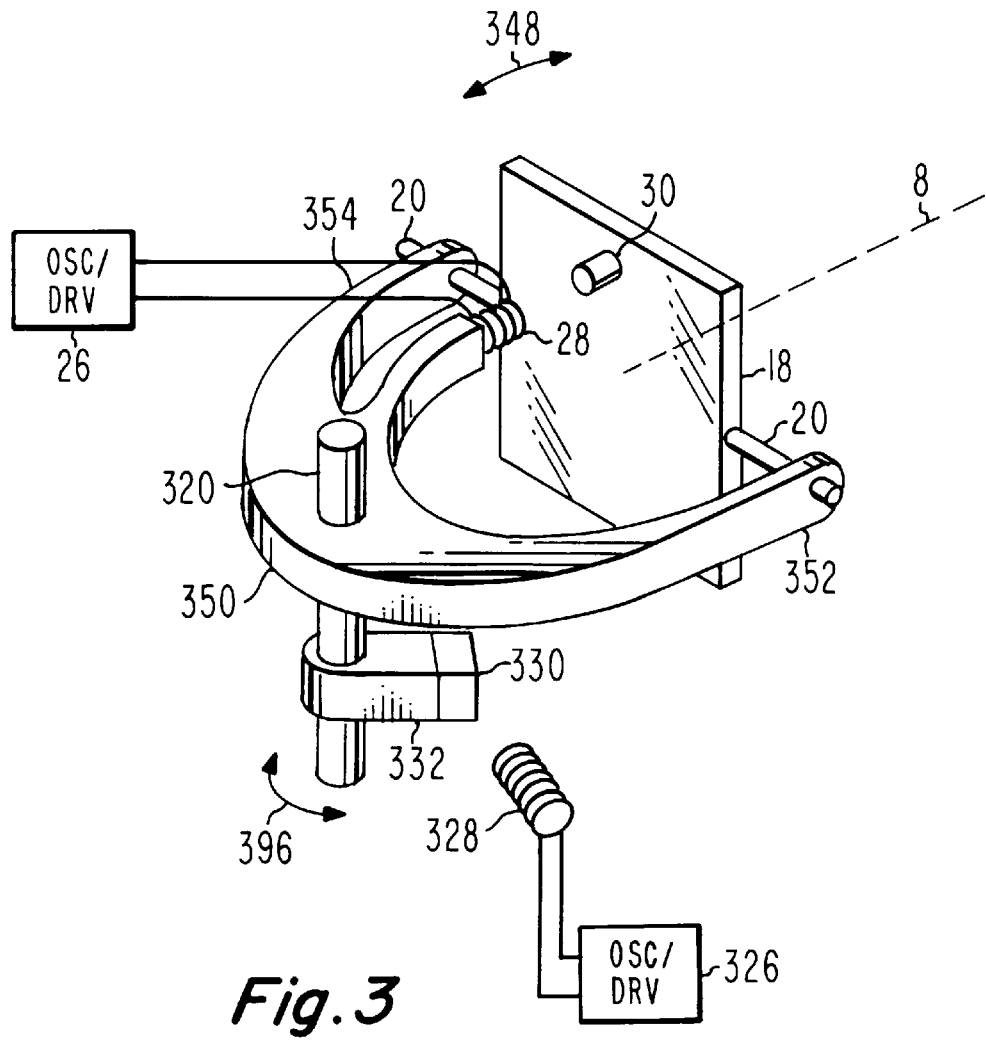
FIG. 3 is a conceptual representation of a mechanical scanner for scanning in two directions.

Those skilled in the art will recognize that the scan described in conjunction with FIG. 2 is a line scan, not a two-dimensional raster scan as illustrated in FIG. 1. FIG. 3 is a simplified representation of a mechanical scanner capable of motion in two planes, to allow scanning in two directions such as illustrated in FIG. 1. In FIG. 3, elements corresponding to those of FIG. 2 are designated by like reference numerals. In FIG. 3, mirror 18 is mounted to pivot on axis shaft 20, which is mounted at the ends of a first arm 352 and a second arm 354 of a mounting 350. Mounting 350 also supports coil 28, which is driven by osc/drv 26, as in FIG. 2, to periodically attract and or repulse iron slug 30, to thereby produce a "nodding" action of the mirror 18, indicated by double-headed arrow 398, which results in reflection of the incident beam 8 along a vertical scan angle. As illustrated in FIG. 3, mounting 350 is held by a vertical shaft 320, which is capable of rotation in the direction indicated by double-headed arrow 396, which allows the entire structure, including the mirror, to pivot around a vertically oriented axis. A further oscillator/driver 326 and coil 328 coact with a magnetically influenced slug 330, connected to shaft 320 by an arm 332, to periodically causes the mirror 18 to swing left and right around vertical shaft 320, as well as up and down around horizontal shaft 20. Both motions can be accomplished simultaneously. If the horizontal motion provided by osc/drv 326 is at a relatively low recurrence rate, such as 10 Hz., and the vertical motion provided by osc/drv 26 is at a higher rate, such as 200 Hz., the reflected light beam will scan 20 times in the vertical direction for each horizontal scan. Of course, the horizontal scanning could be at 200 Hz. and the vertical scanning at 10 Hz, since it is not particularly relevant which direction has the more rapid scan. The relative amount of drive applied to coils 28 and 328 would determine the relative vertical and horizontal scan angles if the structure of FIG. 3 were symmetrical, and equal drives would result in equal vertical and horizontal scan angles θ and φ, respectively. Even when the structure is asymmetrical, as illustrated in FIG. 3, the vertical scan and horizontal scan angles can be selected by selection of the amount of drive signal applied to the coils.

Instead of a moving-mirror scanner as described in conjunction with FIGS. 2 or 3, a moving-lens arrangement, or a lens-&-phase-shifter arrangement, may be used to deflect the laser beam. Such beam deflection arrangements are described in U. S. Pat. No. 5,015,080, issued May 14, 1991 in the name of Cassarly et al.

Figure 4:
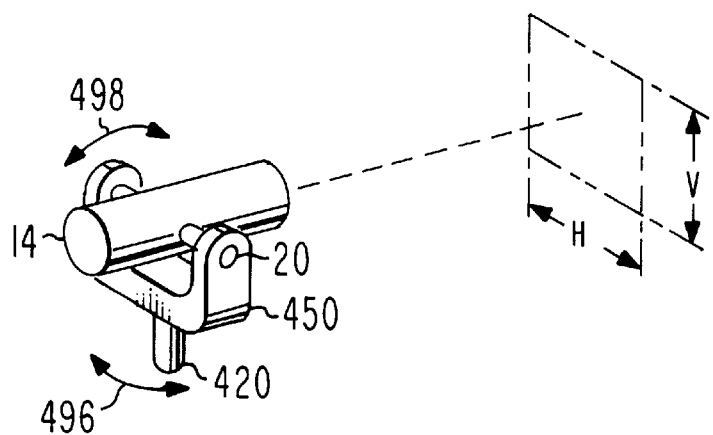
FIG. 4 is a simplified representation of an apparatus according to an avatar of the invention, in which the scanning is accomplished by moving the laser diode.

FIG. 4 illustrates an arrangement in which the laser itself is moved to accomplish the beam scanning. In FIG. 4, laser 14 is illustrated as being pivoted around a pair of axis shafts or trunnions 20 (only one of which is illustrated), which are mounted on a carriage or yoke 450. Yoke 450 is pivoted around a vertical axis on a shaft 420. The electrical connections are not illustrated, but may be made by flexible wires if the angle of rotation is not too large, or slip rings may be used if continuous or large-angle rotation is desired. The mechanical drives are not illustrated, but may be any type of motor.

Figure 5:
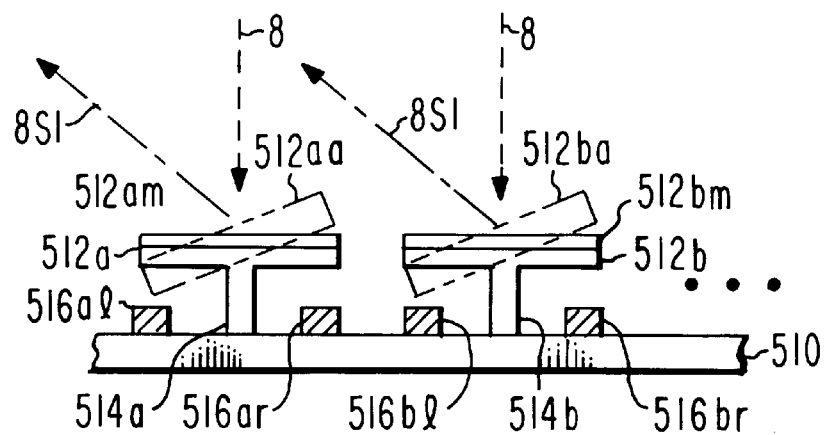
FIG. 5 is a cross-sectional illustration of a microstructure which is known for use in television-type devices.

FIG. 5 is a cross-sectional illustration of a microstructure which is known for use in television-type devices for directing light beams. In the arrangement of FIG. 5, a substrate 510 supports a plurality of flat surfaces 512*a*, 512*b*, . . . , each of which has an upper surface 512*am*, 512*bm*, . . . which is mirrored, so as to reflect incident light beam 8. Flat surfaces 512*a*, 512*b*, . . . are mounted to substrate 510 by support structures or columns 514*a*, 514*b*, . . . , which are thin enough to be flexible. The motor which flexes the supports in this embodiment is electrostatically operated. As illustrated in FIG. 5, a first set of left electrodes 516*al*, 516*bl*, . . . underlie a portion of the associated flat surfaces 512*a*, 512*b*, . . . , and a second set of right electrodes 514*al*, 514*bl*, . . . underlie other edges of the flat surfaces 512*a*, 512*b*, . . . Electrical connections (not illustrated) are also made to the underside of each of the flat surfaces, so that they have a charge. Application of a voltage to the left or right electrodes, in the presence of the charge on the underside of the flat surfaces, causes the flat surfaces to tilt, and the mirrored surfaces to reflect in other directions. For example, if the underside of the flat surfaces is given a negative charge, and the left set of electrodes 516*al*, 516*bl*, . . . is given a positive charge, the left edges of the flat surfaces tilt downward, toward the positively-charged left electrodes, thereby tilting the flat surfaces to their alternate positions, illustrated in phantom as 512*aa*, 512*ba*, . . . The tilting of the flat surfaces also tilts the mirrored surfaces, resulting in deflection of the reflected beam of light 8S1 in an amount determined by the relative magnitudes of the charges. A tilt in the other direction can be accomplished by removing the voltage from the left electrodes, and applying the positive charge to the right electrodes.

Figure 6:
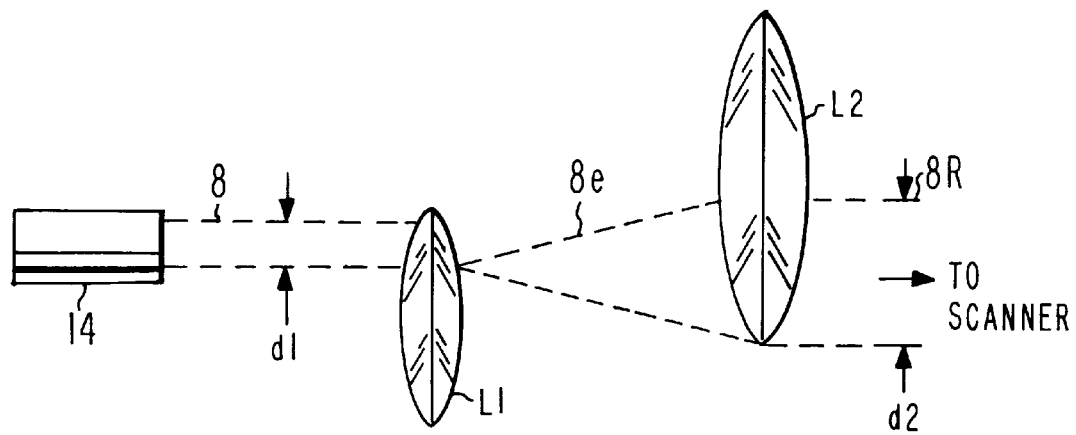
FIG. 6 illustrates an embodiment of the invention in which the laser light beam is broadened, and re-collimated to produce a light beam having a greater cross-section.

In FIG. 6, laser 14 produces collimated laser beam 8, with a diameter identified as d1. The collimated light beam 8 is applied off-center to a first lens L1, which causes a focussing at a point, followed by a divergence in an expanding region 8*e*. A second lens L2 intercepts expanding beam 8*e*, and recollimates it to beam 8R with a diameter d2 larger than diameter d1. This increase of the diameter may make the beam more useful in some embodiments, by changing the scanning rate requirements. In yet another embodiment, lens L2 may be dispensed with, and the diverging laser beam can be scanned, to produce a diverging light beam, somewhat equivalent to a scanned flashlight.

In a particular test of the invention, a gunsight laser was used in a fireman's training location, which was for the purposes of the test filled with smoke, and contained obstructions. The laser beam produced about 3 mw of laser light at about 670 nm. The scanning was accomplished by rapid hand movements. By comparison with a conventional flashlight, the visibility provided by the scanned laser was improved, because of the lack of blooming or reflection from the airborne particles and haze. It was found that the laser could be used to navigate in the environment in a manner comparable to that used by the blind to "feel" their way by use of a walking stick, to differentiate between obstacles and a clear path. The path of the laser beam, illuminated by airborne smoke particles, would be interrupted by objects within the environment. Movement or scanning of the beam by hand allowed location of edges of supporting beams, a staircase, and passageways. The presence of objects was indicated more by the interruption of the beam than by light reflected by the object. In this test, the smoke-filled air was so dense that the laser, which in clear air has a visible range of several hundred yards, was reduced to about fifteen feet. The range of a 635nm laser is expected to be somewhat greater, on the order of twenty-five to thirty feet.

Another set of experiments was made using a 650 nm laser pointer with a defocussable beam in nighttime fog. The focussed laser beam would outline objects such as trees, a fence, and lawn furniture at distances of over 150 feet. The focussed beam scanned as described above allowed easy navigation within the environment. When the beam was defocussed to about a 5° cone, the beam illuminated the fog for about 20 feet, and navigation could still be accomplished without running into objects. However, the effective reduction in beam brightness and useful range were apparent. The beam was then defocussed to about a 30° cone. The apparent beam brightness was again reduced, and the effective range was about two feet, although highly reflective surfaces could be distinguished at about ten feet. Navigation was possible between closely spaced objects. A pair of dark sunglasses was donned; nothing beyond six inches was visible, but the origin of the 30°-defocussed laser beam was visible. With the glasses on and the beam focussed, the visible range was about 30 feet. Reflection from objects in the environment were reduced, but the path of the beam could still be made out, and it could still be used for navigation, as objects could be discerned at about 30 feet. Faster handscanning of the focussed beam made the beam appear as a line, and seemed to reduce the useful range. Perceptions of obstructions or clear paths seem to be more related to depth perception at the apparent interruption of the beam than to the light reflected from an object. The field of view is formed mentally, and may be hindered by the persistence of vision. It may be, therefore, that fast scanning is undesirable. Scan rates of 5°/sec to 200°/sec in one plane should be usable, possibly with scan rate in the other plane at ½ to ⅒ the rate of the primary axis.

Direct electrical control of the light direction would be desirable, because mechanical devices tend to be less reliable than electronic devices. At the present state of the art, non-moving light scanners are not readily available, although the index of refraction of certain materials can be changed under the influence of electrical fields. According to an aspect of the invention, an electrical light scanner could be used, were it available with suitable efficiency, cost, and reliability.

Other embodiments of the invention will be apparent to those skilled in the art. For example, while the described embodiments of the invention are hand-carried, the portable device could be arranged so as to provide illumination for the driver of an automobile or the operator of a vehicle, where the auto or vehicle operate in foggy, hazy, or smoky conditions. While the portable power source has been described as a battery, those skilled in the art know that, if mechanical energy is available, the source may include a generator. In some embodiments, other sources such as capacitors or fuel cells might be preferred. Since the scanning provided by the scanners in the invention bears similarities to the scanning of a television device, it may be advantageous to use electronic devices which are commercially available for television use in illuminators according to the invention, because of their ready availability, reliability and low cost.

If the scan is other than in a single plane, the scan pattern will include a primary plane (slow scan) and a secondary plane (faster scan); the scan angle may be equal in the primary and secondary planes (square), or one may be greater than the other (rectangular or trapezoidal). The orientation of the larger scan angle may be horizontal, vertical, or other. The scan pattern could even be triangular, thereby producing an intensified beam at one apex, for improved range.

Thus, a portable lighting apparatus (10) according to an aspect of the invention includes a laser (14) for, when energized, generating unmodulated visible light in a substantially collimated beam (8). For use in a portable apparatus, the laser (14) should preferably be a solid-state laser (14). The apparatus (10) includes a battery (12) coupled to the laser (14) for energizing the laser (14), for thereby producing the substantially collimated beam (8) of light. An electrically powered light scanner (16) is electrically coupled to the battery (12), and optically coupled to the laser (14), for scanning the beam (8) in at least one direction (H), to produce a scanned beam (8) of the visible light. In another embodiment of the invention, the scanner (16) scans the beam (8) in a second direction (V) orthogonal to the first direction (H), to produce a two-dimensional scanned beam (8S) of the visible light. In a particularly advantageous version of the invention, the scanner (16) includes a mirror (18) interposed in the path of the beam (8), and an electrically powered motor (26, 28, 30) coupled to the mirror (18) for causing the orientation of the mirror (18) relative to the incident light beam (8) to change in a cyclical manner. The greatest utility is believed to be when the light scanner (16) scans the beam (8) in the one direction (H) over a scanning angle (φ) greater than 5° and less than 45°. In order to enable persistence of the perceived view to result in an integrated understanding of the illuminated portion of the environment, each scan of the beam (8) in the one direction (H) occurs in an interval which is no greater than ⅒ second, which is to say a scan rate in that one dimension which is greater than 10 Hz. In such an avatar, the scanner (16), if it scans in a second direction (V), orthogonal to the first direction (H), should scan that second direction (V) in an interval which is no greater than ⅕ of the interval in the one direction (H), which is to say that a scan in the second direction (V) should take no longer than 20% of the time for a scan in the first direction. Thus, plural scans can occur in the second direction (V) during each scan in the first direction (H). Another advantageous manifestation of the invention includes a light beam (8) spreader (210) coupled in the path of the light beam (8) for spreading the substantially collimated light beam (8) emanating from the laser (14) in a manner which broadens the light beam (8), to thereby produce a broad light beam (8). The broad light beam (8) may be substantially collimated or diverging.

A method according to a mode of the invention uses a portable lighting apparatus (10) as set forth in any embodiment above, and includes the step of pointing the scanned beam (8) in the direction in which one may desire to proceed, to thereby illuminate the environment and make any impediments visible.

What is claimed is:

1. A portable lighting apparatus, comprising:
   a laser for, when energized, generating unmodulated visible light in a substantially collimated beam;
   a battery coupled to said laser for energizing said laser; and
   an electrically powered light scanner electrically coupled to said battery and coupled to said laser for scanning said beam in a first direction and in a second direction orthogonal to said first direction, to produce a two-dimensional scanned beam of said visible light.

2. An apparatus according to claim 2, wherein said scanner comprises a mirror interposed in the path of said beam, and an electrically powered motor coupled to said mirror for causing the orientation of said mirror relative to the incident light beam to change in a cyclical manner.

3. An apparatus according to claim 2, wherein said light scanner scans said beam in said first direction over a scanning angle greater than 5° and less than 45°.

4. An apparatus according to claim 4, wherein each said scan of said beam in said first direction occurs in an interval which is no greater than 1/10 second.

5. An apparatus according to claim 5, wherein said scan of said beam in said second direction occurs in an interval which is no greater than 1/5 of said interval in said first direction.

6. An apparatus according to claim 2, further comprising a light beam spreader coupled in the path of said light beam for spreading said substantially collimated light beam in a manner which broadens said light beam to produce a broad light beam.

7. An apparatus according to claim 6, wherein said light spreader produces said broad light beam as a substantially collimated light beam.

8. A method for finding one's way through a smoky, foggy or hazy environment, said method comprising the steps of:
   operating a portable lighting apparatus, said portable apparatus comprising
   a laser for, when energized, generating unmodulated visible light in a substantially collimated beam;
   a battery coupled to said laser for energizing said laser; and
   an electrically powered light scanner electrically coupled to said battery and optically coupled to said laser, for scanning said beam in a first direction and in a second direction orthogonal to said first dimension, to thereby produce a scanned beam of light scanned over two dimensions; and
pointing said scanned beam in the direction in which one may desire to proceed, to thereby illuminate said environment and make any impediments visible.

9. A method according to claim 8, wherein said light scanner scans said beam in said first direction over a scanning angle greater than 5° and less than 45°.

10. A method according to claim 8, wherein each said scan of said beam in said first direction occurs in an interval which is no greater than 1/10 second.

11. A method according to claim 10, wherein said scan of said beam in said second direction occurs in an interval which is no greater than 1/5 of said interval in said first direction.

12. A method according to claim 8, further comprising the step of spreading said substantially collimated light beam in a manner which broadens said light beam to produce a broad light beam.

13. A method according to claim 12, wherein said step of spreading said substantially collimated light beam includes the step of spreading said substantially collimated light beam to produce a broad, substantially collimated light beam.

* * * * *